No. 750,029. PATENTED JAN. 19, 1904.
C. F. GROHMANN.
MACHINE FOR HARVESTING POTATOES OR THE LIKE.
APPLICATION FILED FEB. 26, 1901.
NO MODEL. 2 SHEETS—SHEET 1.
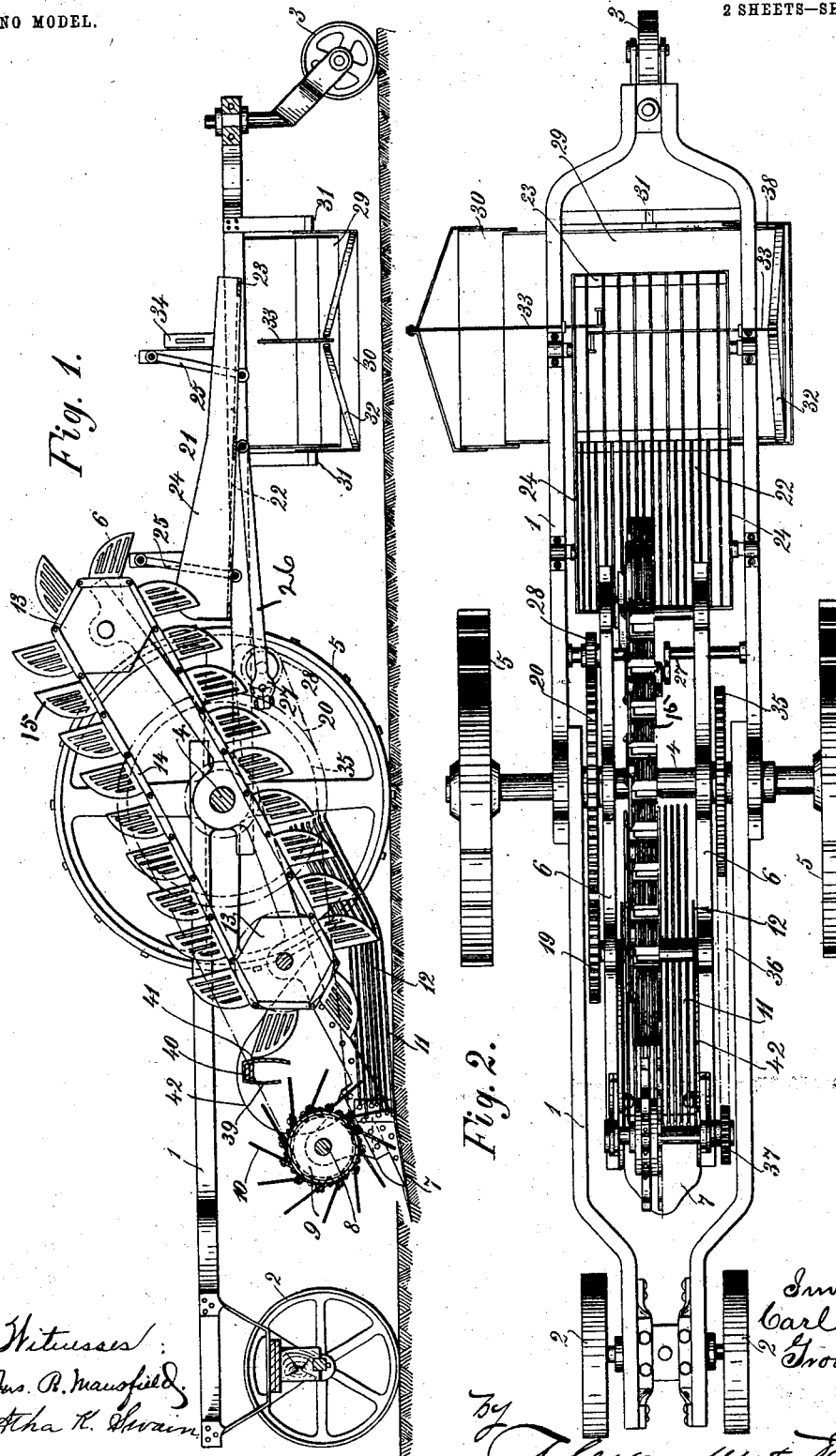
Witnesses:
Jas. B. Mansfield.
Atha K. Swain.
Inventor:
Carl F. Grohmann
By Alexander & Powell.
Attys No. 750,029. PATENTED JAN. 19, 1904.
C. F. GROHMANN.
MACHINE FOR HARVESTING POTATOES OR THE LIKE.
APPLICATION FILED FEB. 26, 1901.
NO MODEL. 2 SHEETS—SHEET 2.

No. 750,029. Patented January 19, 1904.

UNITED STATES PATENT OFFICE.

CARL FERDINAND GROHMANN, OF GÜSTROW, GERMANY.

MACHINE FOR HARVESTING POTATOES OR THE LIKE.

SPECIFICATION forming part of Letters Patent No. 750,029, dated January 19, 1904.

Application filed February 26, 1901. Serial No. 48,968. (No model.)

*To all whom it may concern:*

Be it known that I, CARL FERDINAND GROHMANN, a subject of the Grand Duke of Mecklenburg-Schwerin, residing at Güstrow, in the Grand Duchy of Mecklenburg-Schwerin, Germany, have invented certain new and useful Improvements in Machines for Harvesting Potatoes or the Like, of which the following is a specification.

The present invention is an improved harvesting-machine for potatoes or the like designed to first dig the potatoes or other tubers out of the soil; second, separate the same from the stalks and dirt, and, third, to deposit them in heaps, so they can afterward be conveniently collected.

Figure 4:
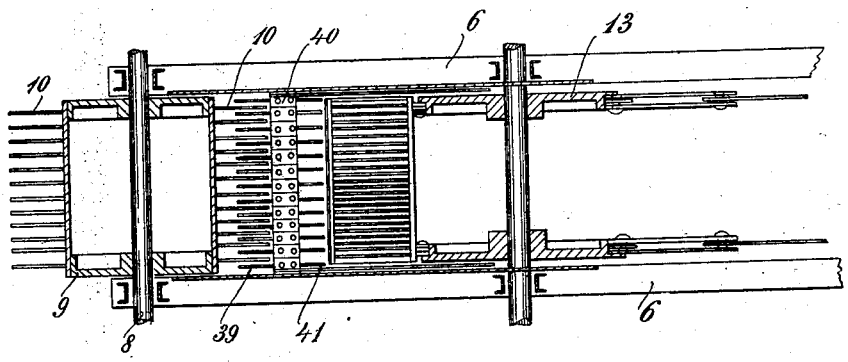
Figure 3:
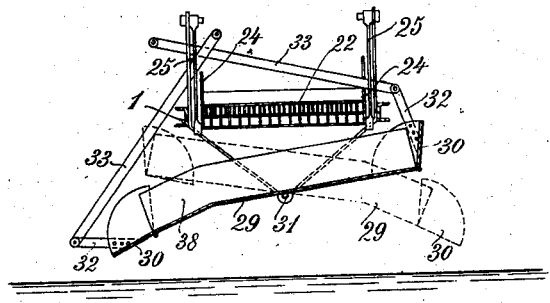

In the accompanying drawings, Figure 1 represents a side elevation of the machine, partly in section. Fig. 2 is a plan view thereof, partly in section. Fig. 3 is a back view of the machine, partly in section; and Fig. 4 is an enlarged horizontal section through the front portion of the machine.

The machine consists of a frame 1, carried by the wheels 2, 3, and 5, the rear wheel 3 being a caster-wheel to facilitate turning the machine. In the frame 1 is journaled a shaft 4, on which are secured the driving-wheels 5.

On the shaft 4 are mounted two opposite side pieces 6, to the lower ends of which is connected a shovel 7, and above the shovel is a cylinder 9, having a number of projecting arms 10. This cylinder 9 is mounted on a shaft 8, which may be journaled in bearings attached to the lower parts of pieces 6, and on shaft 8 is a sprocket-wheel 37, driven by a chain 36 from a sprocket-gear 35 on shaft 4, and in rear of the cylinder is a sieve or receptacle 11, consisting of a number of separate rods, said sieve having sides 12, also consisting of bars.

Between the side pieces 6, near the opposite ends thereof, are mounted two drums or chain-wheels 13, supporting an endless chain 14, carrying elevator-buckets 15. This elevator is operated by the front wheel 13, which is rotated by the gears 19 20 from shaft 4. Underneath the rear end of the elevator is a sieve 21, consisting of a number of rods or bars 22, having a fine mesh for about one-half its length immediately underneath the elevator, while the remaining half of the sieve is coarser. The rods or bars of the sieve are carried by a framework 23, provided with side walls 24. The sieve is suspended on swinging rods 25 and is rocked backward and forward by a pitman 26, which is pivoted to the cranked portion of a shaft 27, driven by the spur-wheels 20 28.

Underneath the coarser part of the sieve 21 is a box or receiver 29, having movable ends 30. This box is pivoted at 31, so that it can be moved into the position shown in dotted lines in Fig. 3. To the ends 30 are secured the arms 32, to which rods 33 are secured, and by means of these rods 33 (which are operated by hand) the box can be tilted on the pivot 31 and fastened by rods 33, which may have a number of teeth on their edges to engage keepers 34 on the frame. Other suitable devices, however, may be used for fastening the rods 33.

Operation: When the frame 1 is moved forward, driving-wheels 5 rotate the shaft 4, which through the described connections operates cylinder 9, the elevator, and the screen 22. The arms 10 on cylinder 9 strike the potatoes, which are raised by the shovel 7, and throw them into the receptacle or sieve 11, by which they are partially separated from dirt, roots, and stems, and they are carried by the elevator to the sieve 21. The buckets may also be provided with sieve-bottoms. Owing to the rocking movement of sieve 21 the potatoes are separated from the dirt adhering thereto and eventually fall into the box 29 and will be heaped against one of the ends 30, according as the box 29 is inclined toward the right or left, from whence they can be removed when desired by releasing that end, as indicated in Fig. 3.

A number of fingers 39 are connected to the side pieces 6 in position to extend between the arms 10 on cylinder 9 for the purpose of cutting the stems caught by the arms 10 in rotating, so that the chopped stems can readily pass through the sieve 11, and to prevent any such stems being advanced by the elevator-buckets 15 a number of fingers 41 are secured to the support 40 to catch any stems or other matter projecting out of the buckets.

What I claim, and desire to secure by Letters Patent of the United States, is—

1. In a potato-harvester, the combination of the wheeled axle and frame, a shovel, a sieve in rear of the shovel, a rotary cylinder above the shovel, provided with arms adapted to throw the potatoes backward into a sieve, stationary fingers adjacent to the cylinder adapted to coact with its arms and break the vines, and means for rotating said cylinder, with an elevated sieve in rear of the first sieve, a conveyer adapted to carry potatoes from the front to the rear sieve, and means for shaking the upper sieve, substantially as described.

2. In a potato-harvester, the combination of the wheeled axle, an inclined frame hung thereon, a shovel and a sieve attached to the lower end of the frame, a pair of rotating wheels on opposite ends of said frame, and an endless series of elevator-buckets supported between and operated by said wheels; with a cylinder journaled in the lower end of the frame and provided with projecting arms over the shovel, the arms of the cylinder being adapted to throw the potatoes back into the sieve, and gearing for rotating said cylinder from the axle, substantially as described.

3. In a potato-harvester, the combination of the main frame, the wheeled axle, an inclined frame supported on the axle, a shovel and a sieve attached to the lower end of the inclined frame, a pair of rotating wheels on opposite ends of the inclined frame, an endless series of elevator-buckets supported between and operated by said wheels, a cylinder provided with projecting arms journaled on the lower end of said inclined frame over the shovel, said arms being adapted to throw the potatoes back into the sieve, and gearing for rotating said cylinder; with a vibrating sieve mounted on the main frame in rear of the incline frame and into which the elevator discharges, and a hopper suspended from the main frame below the vibrating sieve, all substantially as and for the purpose described.

4. In a potato-harvester, the combination of the frame, the wheeled axle, a shovel, a sieve in rear of the shovel, a rotary armed cylinder above the shovel and means for driving it from the axle so as to cause its arms to throw the dirt and potatoes raised by the shovel back toward the elevator, with a series of fingers beside the cylinder coacting with the arms thereon to break the vines, and an endless conveyer adapted to remove the potatoes from the sieve, substantially as described.

5. In a potato-harvester, the combination of the wheeled axle, the inclined frame hung thereon, a shovel, and a sieve in rear of the shovel hung on said frame, an elevated sieve hung on the main frame in rear of the first sieve, and a conveyer supported in said inclined frame adapted to carry potatoes from the front to the rear sieve; with a rotary cylinder on the inclined frame above the shovel, and means for rotating it from the axle, and a series of arms on said cylinder adapted to throw the potatoes back into the sieve, substantially as described.

6. In a potato-harvester, the combination of the wheeled axle, an inclined frame hung thereon, a shovel and a sieve in rear of the shovel mounted on said frame, a rotary cylinder on the said frame above the shovel provided with arms adapted to throw the potatoes into the sieve, and means for driving the cylinder from the axle, with an elevated sieve on the main frame above and in rear of the first sieve, a conveyer adapted to carry potatoes from the front to the rear sieve; means for vibrating the rear sieve, and stationary fingers on the inclined frame adapted to coact with the arms on the cylinder to break vines, &c., substantially as described.

7. In a potato-harvester, the combination of the main frame, the wheeled axle, an inclined frame supported on the axle, a shovel and a sieve attached to the lower end of the inclined frame, a pair of rotating wheels on opposite ends of the inclined frame, an endless elevator carried on and operated by said wheels; a rotating series of projecting arms journaled on said inclined frame over the shovel, stationary fingers on the frame beside the arms, and gearing for rotating said series of arms whereby the arms are caused to throw the potatoes backward into the sieve, substantially as described.

In testimony whereof I have hereunto set my hand in the presence of two witnesses.

CARL FERDINAND GROHMANN.

Witnesses:
PAUL FRIEDRICH DÜHRKOOP,
LEO FOLLER.